(12) United States Patent
Jain

(10) Patent No.: US 7,737,669 B2
(45) Date of Patent: Jun. 15, 2010

(54) HIERARCHICAL CONTROL FOR AN INTEGRATED VOLTAGE REGULATOR

(75) Inventor: Rinkle Jain, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 432 days.

(21) Appl. No.: 11/694,248

(22) Filed: Mar. 30, 2007

(65) Prior Publication Data

US 2008/0238380 A1 Oct. 2, 2008

(51) Int. Cl.
*G05F 1/59* (2006.01)
(52) U.S. Cl. .................. 323/272; 323/285; 323/907
(58) Field of Classification Search .......... 323/272, 323/283, 285, 907; 307/58; 363/70, 71
See application file for complete search history.

(56) References Cited

U.S. PATENT DOCUMENTS

| 6,281,666 | B1 * | 8/2001 | Tressler et al. ............. 323/272 |
| 6,674,274 | B2 * | 1/2004 | Hobrecht et al. ............ 323/285 |
| 6,737,763 | B2 * | 5/2004 | Liu et al. .................. 307/58 |
| 6,806,689 | B2 * | 10/2004 | Schuellein et al. ........... 323/272 |
| 6,940,736 | B2 * | 9/2005 | Jonsson ..................... 363/71 |
| 6,995,548 | B2 * | 2/2006 | Walters et al. .............. 323/272 |
| 7,479,772 | B2 * | 1/2009 | Zane et al. ................. 323/272 |
| 2006/0255777 | A1 * | 11/2006 | Koertzen ................... 323/272 |
| 2008/0129260 | A1 * | 6/2008 | Abu Qahouq et al. ....... 323/272 |

\* cited by examiner

*Primary Examiner*—Jeffrey L Sterrett
*Assistant Examiner*—Fred E Finch, III
(74) *Attorney, Agent, or Firm*—Grossman, Tucker, Perreault & Pfleger, PLLC

(57) ABSTRACT

A hierarchical control for an integrated voltage regulator may include a voltage regulator circuit with a plurality of parallel voltage cells, with each of the cells having a plurality of phases of interleaved voltage converters, and a feedback control associated with the cells to set identical current references for the phases. A multi-rail embodiment has a plurality of parallel voltage regulator circuits each with a plurality of parallel voltage cells, with each of the cells having a plurality of phases of interleaved voltage converters, and a feedback control associated with the circuits to sense parameters of the circuits and set identical parameter references for the phases.

20 Claims, 4 Drawing Sheets

HIERARCHICAL CONTROL FOR AN INTEGRATED VOLTAGE REGULATOR

FIELD

The present disclosure relates to voltage regulators. More specifically, a hierarchical control topology for voltage regulators on silicon is disclosed.

BACKGROUND

A voltage regulator (VR) circuit generates a voltage rail at a rated voltage and current. It consists of several voltage regulator cells that function in parallel. Each of these cells further comprises several interleaved phases of DC-DC converters. There is a feedback control topology associated with each of these cells.

Such a common VR topology senses the load current and sets identical current references for all the phases within the cell. It also generates the delayed duty cycles for each of these phases required for interleaved operation. Conventionally, each of these cells in a circuit is implemented to share the load current equally. This results in a power efficiency that is a strong function of the load, resulting in low efficiency under low load conditions. Maximum efficiency is achieved at a certain load condition and any other load condition results in low power efficiency.

Attempts to improve efficiency in isolated power supply modules over a broader range of load conditions, such as by switching cells on and off, has proven to be of limited benefit. Such power supply modules (cells) must be discretely implemented and are limited to a few in number. Control requires the use of fast analog ICs since the number of power supply units operated in parallel is less. In integrated implementation, several tens of VR cells may need to operate in parallel. Extending such an implementation to an IVR application is not practical Lacking in the prior art is a simple power circuit with a hierarchical control for improving efficiency and optimizing performance under all load conditions in an integrated VR of many cells.

BRIEF DESCRIPTION OF DRAWINGS

Features and advantages of the claimed subject matter will be apparent from the following detailed description of embodiments consistent therewith, which description should be considered with reference to the accompanying drawings, wherein:

Although the drawings and following description will proceed with reference being made to illustrative embodiments, many alternatives, modifications, and variations thereof will be apparent to those skilled in the art. Accordingly, it is intended that the claimed subject matter be viewed broadly.

DETAILED DESCRIPTION

Figure 1:
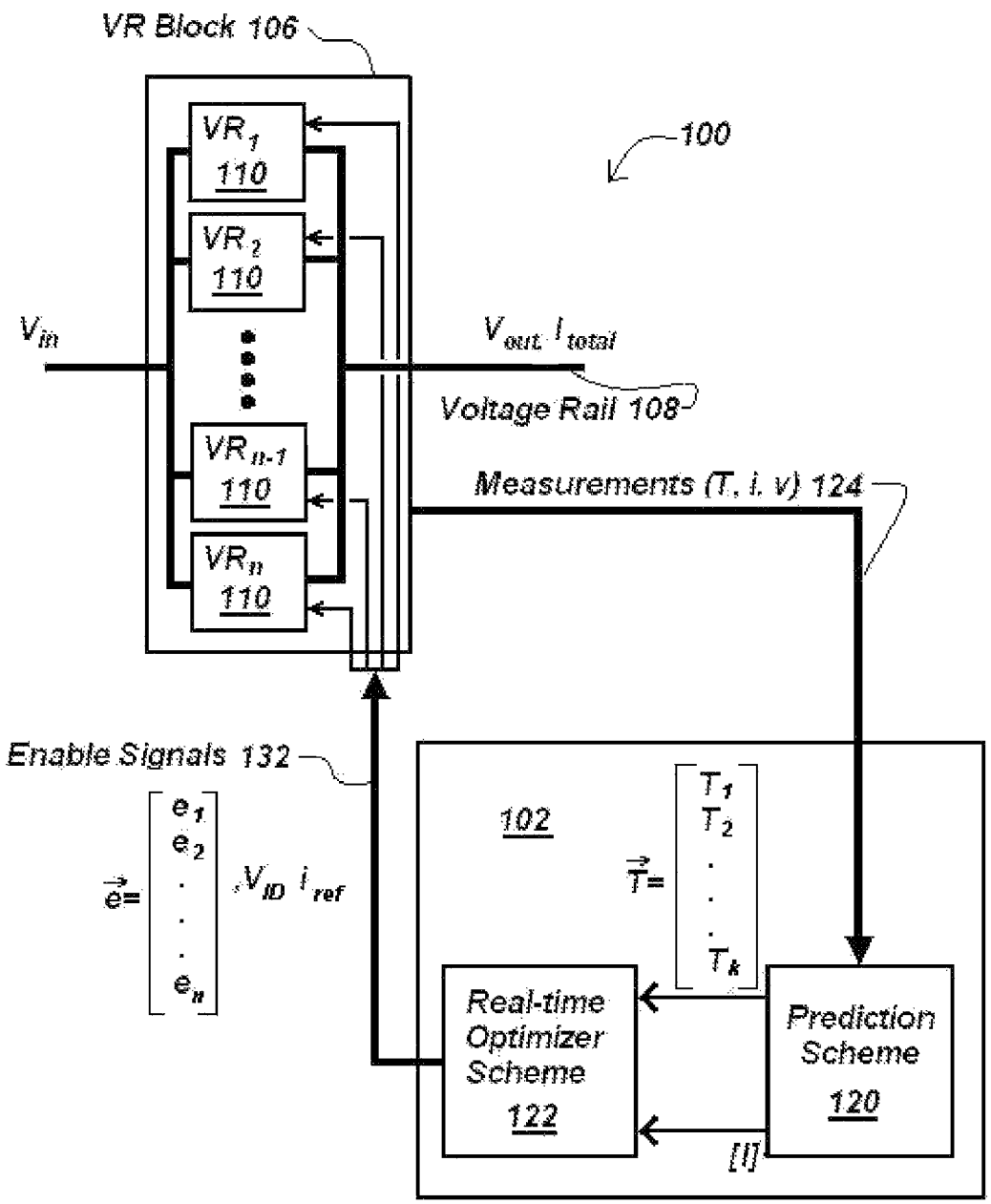
FIG. 1 is a diagram of an integrated VR hierarchical control according to the present disclosure.

An integrated voltage regulation system 100 using a first integrated parallel voltage regulator virtualization topology 102 that is consistent with the present disclosure is shown in FIG. 1. Voltage regulator circuit 106 generates a voltage rail 108 at a rated voltage and current. Circuit 106 consists of several voltage regulator cells 110 that are functioning in parallel.

Figure 2:
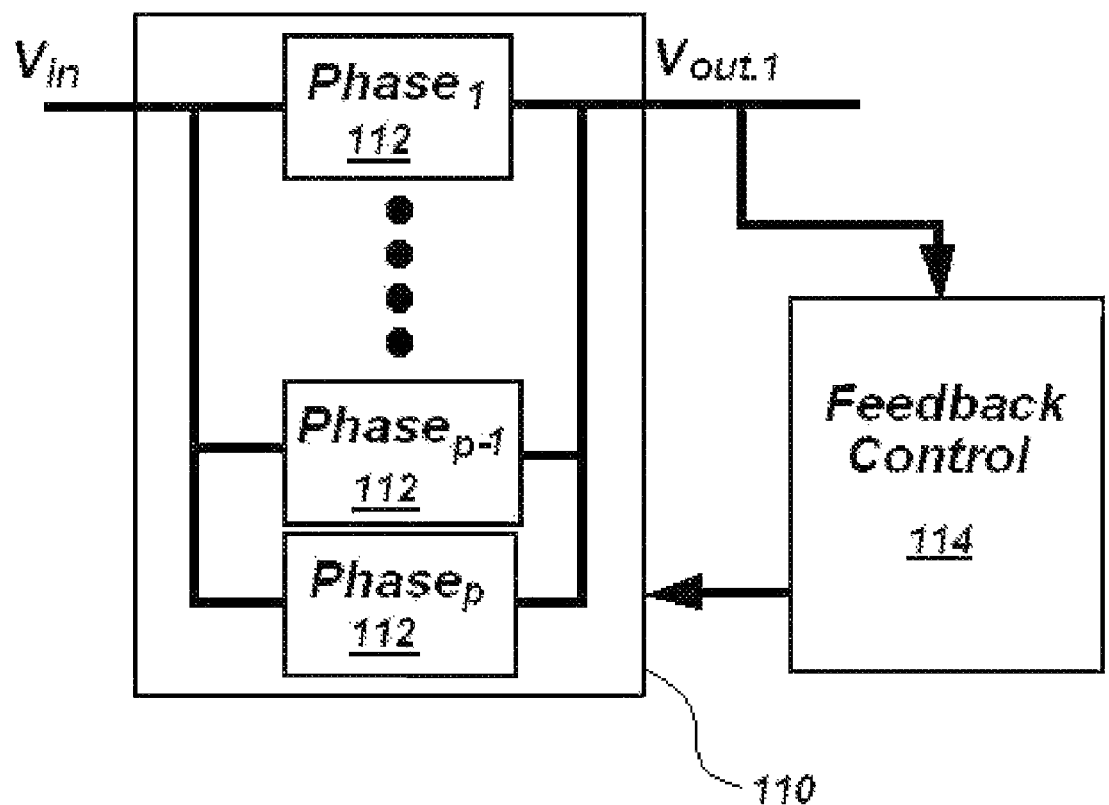
FIG. 2 is a partial diagram showing the VR cells of a hierarchical control according to FIG. 1.

Each of cells 110, shown in more detail in FIG. 2, further comprises several phases of interleaved DC-DC converters 112. For each of cells 110 there is an associated feedback control circuit 114. Control circuit 114 senses the load current and sets identical current references for all the phases 112 within the cell. Control circuit 114 also generates the delayed duty cycles for each of these phases required for interleaved operation. In the proposed topology, each of the cells in a circuit shares the load current optimally, thereby resulting in a flat power efficiency curve and optimal performance under all load conditions.

Topology 102 is referred to as a "virtualization topology" because it senses various parameters of each cell, for example, voltage, current and temperature and facilitates VR circuit 106 to optimally function as one power converter. Topology 102 simplifies the power circuitry by adding more intelligence to the control. Topology 102 also includes a prediction circuit 120 and real-time optimization circuit 122.

Depending on the number of sensors that are realizable on silicon, some of the required parameters may be estimated as well as predicted by prediction circuit 120. A set of measurements 124 may be taken, including load current i, die temperature T, and voltages v, for direct use and for estimating/predicting other required parameters. These parameters may provide the realization of the desired transient response and improved thermal performance. This may be done by using a model of the system and a suitable algorithm.

Virtualization topology 102 may be completely implemented on silicon directly or on a processor or a combination of both depending on its functionality, implementation and packaging. Voltage level programmability input to each circuit 106 may be realized.

Real-time optimizer circuit 122 may also generate enable/disable signals 132 for all cells 110 within a VR circuit 106. If the load current of a cell that corresponds to its maximum power efficiency is given by $I_0$, for a total load current $I_{total}$, drawn from a voltage rail 108, n is defined as the ratio $I_{total}/I_0$ truncated to the lower integer. The n cells may each supply the optimal loads $I_0$ and one cell supplies the remaining current $i_{ref}(t)$ to meet the total load demand in steady state. Also, VR cells supplying high current may be migrated to mitigate thermal problems.

Topology 102 may be used when there are N VR cells in parallel, each rated for $P_0/N$. Each VR cell may be operated at its optimal load where efficiency is maximum when it is powered on. For any load condition $I_{total}$ the following equation may be used to solve for the integer n(t);

$$n(t)I_0 + i_{ref}(t) = I_{total}(t)$$

So at any point in time, n number of VRs may supply optimal load $I_0$ at efficiency $\eta_0$ and one VR supplies the remaining load current $i_{ref}(t)$ to meet the total demand at efficiency $\eta_x$. Input power is given by;

$$P_{in} = (nV_{out}I_0)/\eta_0 + (V_{out}i_{ref}(t))/\eta_x.$$

Here, the VR cell design may allow that maximum efficiency is achieved at each cell's rated load condition so that $$I_0 = I_{rated}/N$$

where $I_{rated}$ is the current rating of the VR.

Effective power efficiency of the system can be written as;

$$\eta_{effective} = (nV_{out}I_0 + V_{out}i_{ref}(t))/P_{in} = [I_{total}(t)/(nI_0 + i_{ref}\eta_0/\eta_x)]\eta_0$$

Alternatively, the number of cells enabled can be adaptively changed, while sharing the current equally between the functioning cells. The efficiency in this case is reasonably similar to the case described above.

Figure 3:
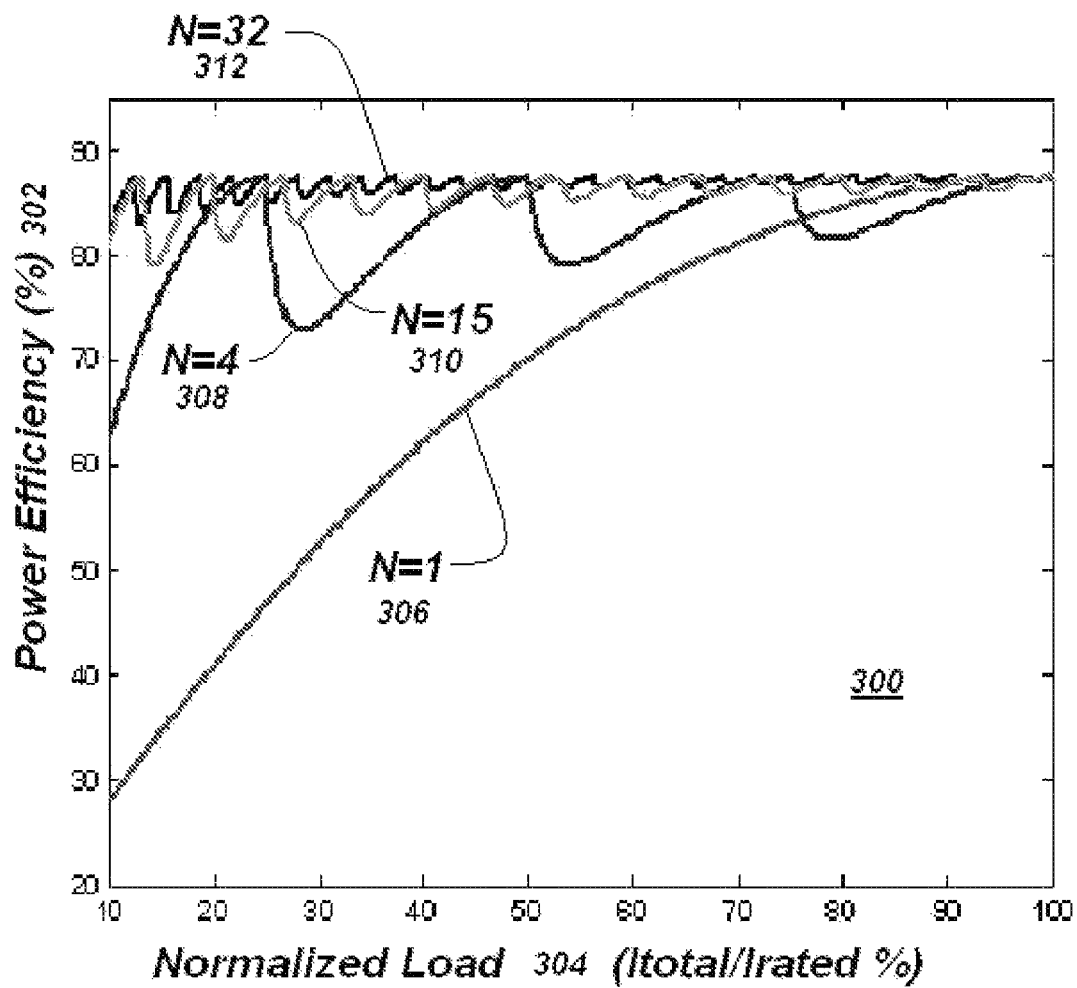
FIG. 3 is a comparison chart of the efficiency of a 32-cell hierarchical control according to FIG. 1 versus that of a typical prior art VR.

FIG. 3 is a graph 300 of the efficiency curves comparing Performance Efficiency percentage 302 against Normalized Load 304 (the percentage ratio of I total to I), for a voltage regulating virtualization topology according to the disclosure, such as topology 102 of FIG. 1, for different values of N. It can be noticed that using the topology 102, larger N yields an improved efficiency curve.

The efficiency curve 306 of a single cell (N=1) is identical to that of an integrated VR of equal load sharing and rated power $P_0$. Curve 308 relates to a system of 4 cells. Curve 310 relates to a system of 15 cells. Curve 312 relates to a system of 32 cells. In addition to the flattening of the efficiency curve as N increases, the topology may provide maximum efficiency at all load conditions that are a multiple of the rated current of a single cell. The virtualization topology brings substantial benefits in integrated VRs since N may be large in some implementations.

Figure 4:
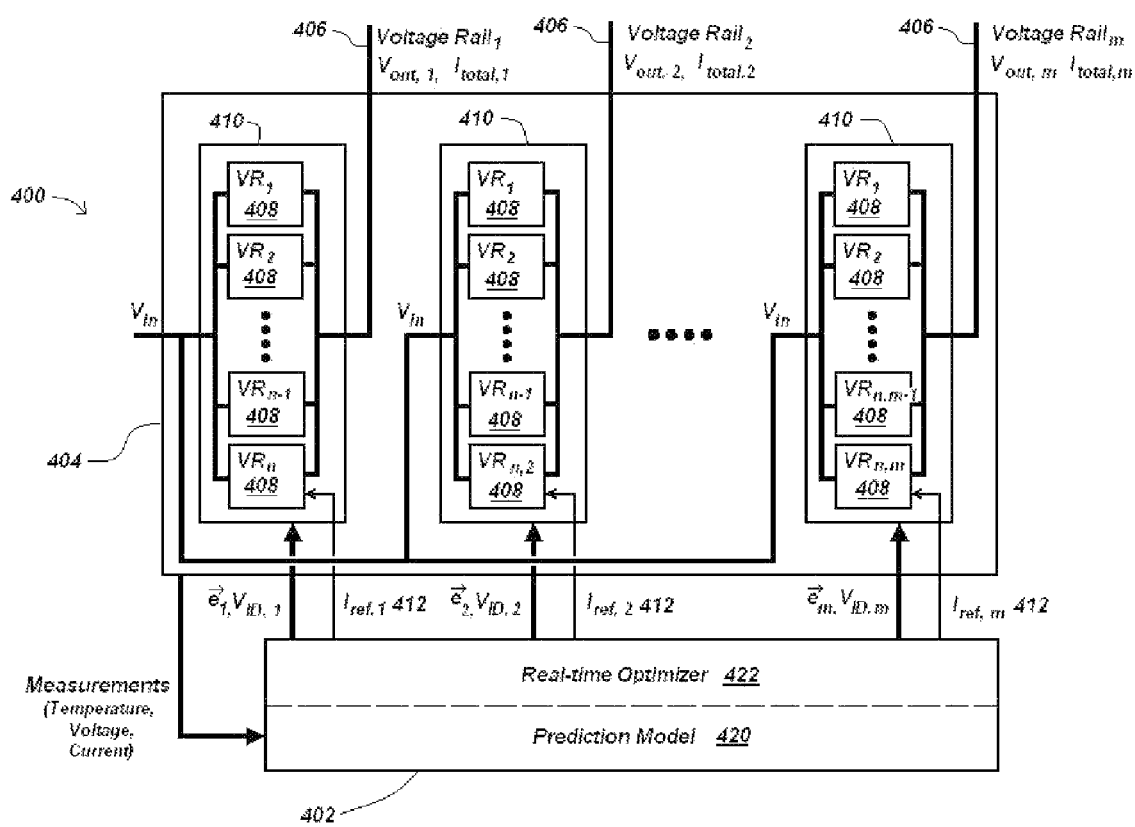
FIG. 4 is a diagram of a multi-rail integrated VR hierarchical control according to the present disclosure.

FIG. 4 depicts a multi-rail VR system 400. The virtualization topology 402 according to the disclosure facilitates cell replication to meet a voltage rail specification. An integrated VR system 404 as shown may generate m different programmable voltage rails 406. Identical VR cells 408 may be used in sufficient number to realize a VR circuit 410 of any size, thus simplifying design stage considerably. In this topology, only one cell per circuit requires a programmable current reference 412, while the others can have a fixed current reference.

Topology 402 includes prediction circuit 420 and real-time optimization circuit 422 functions as previously described. As a further advantage, a feedback loop in each cell may not be required, depending on the nature of control to be used (linear/nonlinear). A simple feed forward control may provide line regulation within a cell, and the steady state duty cycle for each control may be generated by the virtualization topology. This greatly simplifies the power circuit.

Thus it can be seen that virtualization topology 402 also narrows down the range of operating points of each VR cell, which may improve the efficiency curve of a single cell. Higher power efficiency may be obtained with the added feature of a look-up table to determine the optimal load condition for a cell at any output voltage level.

Various features, aspects, and embodiments have been described herein. The features, aspects, and numerous embodiments described herein are susceptible to combination with one another as well as to variation and modification, as will be understood by those having skill in the art. The present disclosure should, therefore, be considered to encompass such combinations, variations, and modifications.

The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Other modifications, variations, and alternatives are also possible. Accordingly, the claims are intended to cover all such equivalents.

What is claimed is:

1. An integrated voltage regulator (VR) comprising:
   a voltage regulator circuit comprising a plurality of parallel voltage cells, each of said cells comprising a plurality of phases of interleaved voltage converters configured to be individually enabled or disabled;
   a feedback control circuit configured to sense parameters of each of said cells and set identical parameter references for all of said phases; and
   a real-time optimization circuit for generating an enable/disable signal for each of said cells,
   wherein said real-time optimization circuit is configured to enable a number of cells n(t) each operating at a maximum power efficiency $I_0$ and a single cell operating at below its maximum power efficiency, wherein n(t) is ratio of $I_{total}(t)/I_0$ truncated to the lower integer where $I_{total}(t)$ is the total load current.

2. The VR of claim 1, wherein said feedback control circuit generates a delayed duty cycle for each of said phases.

3. The VR of claim 1, further comprising:
   a prediction circuit for estimating at least one parameter of said plurality of parallel voltage cells based on at least one of said sensed parameters.

4. The VR of claim 3, wherein said sensed parameters comprise load currents and said parameter references comprise current references.

5. The VR of claim 4, wherein said sensed parameters further comprise output voltages and said parameter references further comprise voltage references.

6. The VR of claim 4, wherein said sensed parameters further comprise die temperatures and said parameter references further comprise temperature references.

7. The VR of claim 4, wherein said sensed parameters further comprise die temperatures and output voltages and said parameter references further comprise temperature references and voltage references.

8. A multi-rail integrated voltage regulator (VR), comprising:
   a plurality of parallel voltage regulator circuits each comprising a plurality of parallel voltage cells, each of said cells comprising a plurality of phases of interleaved voltage converters configured to be individually enabled or disabled;
   a plurality of feedback control circuits corresponding to said VR circuits, said feedback control circuits configured to sense one or more parameters of each of said VR circuits and set identical parameter references for all of said phases; and
   a real-time optimization circuit for generating an enable/disable signal for each of said cells,
   wherein said real-time optimization circuit is configured to enable a number of cells n(t) each operating at a maximum power efficiency $I_0$ and a single cell operating at below its maximum power efficiency, wherein n(t) is ratio of $I_{total}(t)/I_0$ truncated to the lower integer where $I_{total}(t)$ is the total load current.

9. The VR of claim 8, wherein each of said feedback control circuits generates a delayed duty cycle for each of said phases.

10. The VR of claim 8, further comprising:
    a prediction circuit for estimating at least one parameter of said plurality of parallel voltage cells based on at least one of said sensed parameters.

11. The VR of claim 10, wherein said sensed parameters comprise load currents and said parameter references comprise current references.

12. The VR of claim 11, wherein said sensed parameters further comprise output voltages and said parameter references further comprise voltage references.

13. The VR of claim 11, wherein said sensed parameters further comprise die temperatures and said parameter references further comprise temperature references.

14. The VR of claim 11, wherein said sensed parameters further comprise die temperatures and output voltages and said parameter references further comprise temperature references and voltage references.

15. A hierarchical control method for integrated voltage regulation comprising:
    providing a voltage regulator circuit comprising a plurality of parallel voltage cells, each of said cells comprising a plurality of phases of interleaved voltage converters configured to be individually enabled or disabled;
    providing a feedback control circuit associated with said cells;
    sensing parameters of each of said cells by said feedback control circuit;
    setting identical parameter references for all of said phases by said feedback control circuit; and
    enabling a number of cells n(t) each operating at a maximum power efficiency $I_0$ and a single cell operating at below its maximum power efficiency, wherein n(t) is ratio of $I_{total}(t)/I_0$ truncated to the lower integer where $I_{total}(t)$ is the total load current.

16. The hierarchical control method of claim 15, further comprising:
    generating a delayed duty cycle for each of said phases by said feedback control circuit.

17. The hierarchical control method of claim 15, further comprising:
    estimating at least one parameter of said plurality of parallel voltage cells based on at least one of said sensed parameters with a prediction function circuit.

18. The hierarchical control method of claim 17, wherein said sensed parameters comprise load currents and said parameter references comprise current references.

19. The hierarchical control method of claim 18, wherein said sensed parameters further comprise output voltages and said parameter references further comprise voltage references.

20. The hierarchical control method of claim 18, wherein said sensed parameters further comprise die temperatures and said parameter references further comprise temperature references.

* * * * *